(12) United States Patent
Yousefiani

(10) Patent No.: US 7,824,783 B2
(45) Date of Patent: Nov. 2, 2010

(54) COATING FOR COMPONENTS REQUIRING HYDROGEN PEROXIDE COMPATIBILITY

(75) Inventor: Ali Yousefiani, Arcadia, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/774,086

(22) Filed: May 5, 2010

(65) Prior Publication Data

US 2010/0212283 A1  Aug. 26, 2010

Related U.S. Application Data

(62) Division of application No. 11/533,570, filed on Sep. 20, 2006, now Pat. No. 7,736,751.

(51) Int. Cl.
*B32B 9/00* (2006.01)
*B32B 19/00* (2006.01)

(52) U.S. Cl. ............. 428/698; 244/135 R; 60/205; 60/251; 60/257; 60/772; 427/255.36; 427/255.394

(58) Field of Classification Search ............. 244/135 R; 60/205, 251, 257, 772; 428/698; 427/255.36, 427/255.392
See application file for complete search history.

(56) References Cited

U.S. PATENT DOCUMENTS

| | | | |
|---|---|---|---|
| 2,056,894 A * | 10/1936 | Bretschger | 53/401 |
| 4,839,245 A | 6/1989 | Sue et al. | |
| 6,314,719 B1 | 11/2001 | Hunt et al. | |
| 6,887,821 B2 | 5/2005 | Mays et al. | |
| 6,895,756 B2 | 5/2005 | Schmotolocha et al. | |
| 6,949,152 B2 | 9/2005 | Hallit et al. | |
| 6,968,695 B2 | 11/2005 | Schmotolocha et al. | |
| 2002/0058107 A1 * | 5/2002 | Fareed et al. | 427/255.39 |

OTHER PUBLICATIONS

"Hydrogen Peroxide Technical Bulletin," FMC Corporation, Philadelphia, Pennsylvania (2002).
"Zirconium in Hydrogen Peroxide Applications," Wah Chang (Allegheny Technologies, Inc.), Albany, Oregon (2003).
"Materials of Construction for the Storage of Hydrogen Peroxide," Solvay Chemicals, Inc., Longview, Washington (2004).

* cited by examiner

*Primary Examiner*—Michael C Miggins
(74) *Attorney, Agent, or Firm*—McNees Wallace & Nurick, LLC

(57) ABSTRACT

The present invention provides a heretofore-unknown use for zirconium nitride as a hydrogen peroxide compatible protective coating that was discovered to be useful to protect components that catalyze the decomposition of hydrogen peroxide or corrode when exposed to hydrogen peroxide. A zirconium nitride coating of the invention may be applied to a variety of substrates (e.g., metals) using art-recognized techniques, such as plasma vapor deposition. The present invention further provides components and articles of manufacture having hydrogen peroxide compatibility, particularly components for use in aerospace and industrial manufacturing applications. The zirconium nitride barrier coating of the invention provides protection from corrosion by reaction with hydrogen peroxide, as well as prevention of hydrogen peroxide decomposition.

11 Claims, 3 Drawing Sheets

COATING FOR COMPONENTS REQUIRING HYDROGEN PEROXIDE COMPATIBILITY

The invention described herein was made in the performance of work under NASA Contract No. NCC8-190 and is subject to the provisions of Section 305 of the National Aeronautics and Space Act of 1958 (72 Stat. 435, 42 U.S.C. 2457).

FIELD OF THE INVENTION

The present invention is directed to a coating for components requiring hydrogen peroxide compatibility, including components for use in aerospace and industrial manufacturing applications in which the components are exposed to hydrogen peroxide, especially high concentration hydrogen peroxide.

BACKGROUND OF THE INVENTION

Hydrogen peroxide ($H_2O_2$) is one of the most versatile and ecological oxidizing agents. Hydrogen peroxide has been used as monopropellant in aerospace applications and has several advantages as a propellant. It has good long term on-orbit storage capability at near hypergolic performance and it lacks the toxicity and handling issues associated with other hypergolic propellants. It is also not carcinogenic. It is dense, storable, noncryogenic and can be more easily used to drive gas turbines to give high pressures. Hydrogen peroxide trades well as a mono- and bi-propellant due to high density. It is readily available and costs less than hydrazine.

However, hydrogen peroxide is a very aggressive propellant, and it is highly corrosive. Its utility has been limited by material incompatibility, corrosion, and degradation, poor storage stability, and decomposition. The incompatibility of hydrogen peroxide significantly escalates design complexity and costs associated with fabricating rocketry systems to support it. Only a few materials were previously known to be appropriate for long-term exposure to hydrogen peroxide, such as pure aluminum, pure zirconium, certain binary aluminum-magnesium alloys, porcelain, and fluorocarbon resins. These materials, however, are generally not suitable for aerospace applications, which require materials to withstand extreme temperatures, pressures, mechanical stress, and radiation exposure.

There is a need for materials that are compatible with hydrogen peroxide. In particular, there is a need for materials that do not corrode or degrade as a result of exposure to hydrogen peroxide and that do not catalyze the decomposition of hydrogen peroxide, especially high concentration hydrogen peroxide. The present invention fulfills this need, and further provides related advantages.

SUMMARY OF THE INVENTION

The present invention provides a heretofore-unknown use for zirconium nitride as a hydrogen peroxide compatible protective coating that was discovered to be useful to protect components that catalyze the decomposition of hydrogen peroxide or corrode when exposed to hydrogen peroxide. A zirconium nitride coating of the invention may be applied to a variety of substrates (e.g., metals) using art-recognized techniques, such as plasma vapor deposition. The present invention further provides components and articles of manufacture having hydrogen peroxide compatibility, particularly components for use in aerospace and industrial manufacturing applications. The zirconium nitride barrier coating of the invention provides protection from corrosion by reaction with hydrogen peroxide, as well as prevention of hydrogen peroxide decomposition.

The invention provides a method of protecting an aerospace vehicle propellant system comprising the step of coating a propellant-contacting surface of a propellant system with a zirconium nitride barrier coating. The propellant-contacting surface is thereby protected from corrosion or degradation when in contact with hydrogen peroxide and the factors reducing propellant effectiveness (e.g., active oxygen loss, propellant stability, metallic/organic contamination, and system level pressure rise) due to the influence of the wetted components are also minimized.

The invention also provides a rocket engine component comprising a substrate having a propellant-contacting surface and zirconium nitride barrier coating overlaying the substrate and formed on or deposited on the propellant-contacting surface. The propellant-contacting surface is protected by the zirconium nitride barrier coating from corrosion when in contact with a hydrogen peroxide propellant, and hydrogen peroxide is protected from decomposition by reaction with the substrate.

In another embodiment, the invention includes a container adapted for holding or transporting hydrogen peroxide, wherein the container comprises a material (e.g., metal) having an interior hydrogen peroxide-contacting surface and zirconium nitride barrier coating overlaying and formed on or deposited on the interior hydrogen peroxide-contacting surface. A typical container is any object that can be used to hold things, especially a rigid, uniform, sealable or closable, reusable boxlike object (e.g., a tank) of standardized dimensions, which may be readily transported.

The invention also pertains to an article adapted for use in a hydrogen peroxide containing environment, wherein the article comprises a substrate (e.g., a metal) and a barrier coating of zirconium nitride disposed on said substrate for protecting the substrate from reacting with hydrogen peroxide.

Other features and advantages of the present invention will be apparent from the following more detailed description of preferred embodiments, taken in conjunction with the accompanying drawings which illustrate, by way of example, the principles of the invention.

DETAILED DESCRIPTION OF THE INVENTION

Figure 1A:
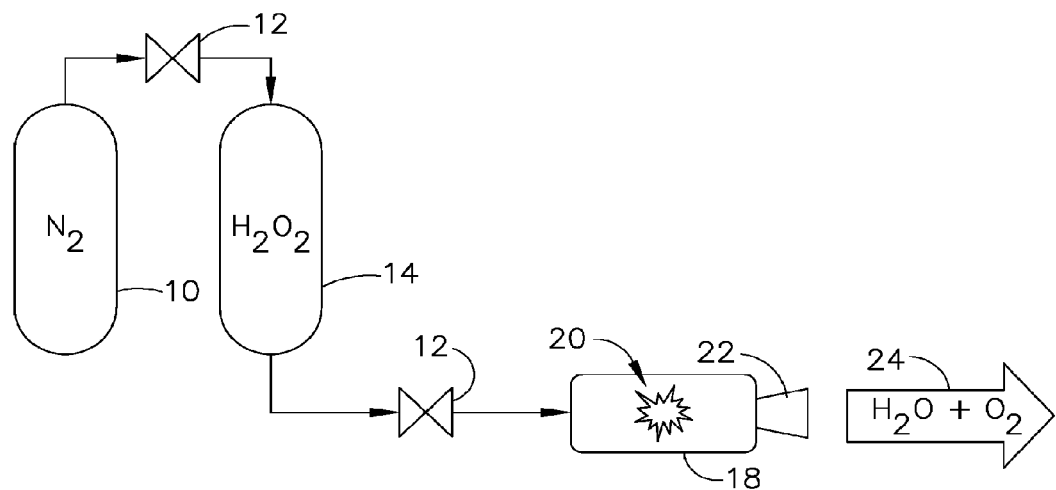
FIG. 1A and FIG. 1B schematically illustrate the components of monopropellant rocket propulsion systems with a pressurized fuel tank and a fuel pump, respectively, in which hydrogen peroxide is used as a propellant.

The invention provides a method of protecting an aerospace vehicle propellant system comprising the step of coating a propellant-contacting surface of a propellant system with a zirconium nitride barrier coating. The propellant-contacting surface is thereby protected from corrosion when in contact with hydrogen peroxide. The invention provides a method of protecting an aerospace vehicle propellant system comprising the steps of providing a hydrogen peroxide propellant system comprising a propellant tank and means for conveying a propellant from said propellant tank, and thereafter coating a propellant-contacting surface of said propellant system with a zirconium nitride barrier coating. The propellant-contacting surface is thereby protected from corrosion or degradation when in contact with a hydrogen peroxide propellant and the factors reducing propellant effectiveness (e.g., active oxygen loss, propellant stability, metallic or organic contamination, and system level pressure rise) due to the influence of the wetted components are also minimized. Example means for conveying the propellant include pressure regulators, flow regulators, valves, lines, gauges, pumps, hoses, conduits, or any other such device that forms a pathway through which propellant flows from the propellant tank to the combustion chamber.

In an embodiment, the coating step comprises evaporating a zirconium source under reduced pressure and condensing vapor or plasma onto a substrate thereby forming a zirconium nitride barrier coating.

In an embodiment of the invention, the thickness of the zirconium nitride barrier coating is between about 0.025 μm and about 250 μm. In another embodiment, the thickness of the zirconium nitride barrier coating is between about 1 μm and about 25 μm.

In aerospace applications, the hydrogen peroxide propellant may be greater than or equal to about 30% hydrogen peroxide by weight. The weight balance of the propellant may be water or any other compatible material. The hydrogen peroxide propellant may also be greater than or equal to about 70% hydrogen peroxide by weight. In yet another embodiment, the hydrogen peroxide propellant is greater than or equal to about 90% hydrogen peroxide by weight. In still another embodiment, the hydrogen peroxide propellant is greater than or equal to about 98% hydrogen peroxide by weight.

The invention also provides a rocket engine component comprising a substrate having a propellant-contacting (e.g., a hydrogen peroxide-contacting) surface and zirconium nitride barrier coating overlaying the substrate and formed on or deposited on the propellant-contacting surface. The propellant-contacting surface is protected by the zirconium nitride barrier coating from corrosion when in contact with hydrogen peroxide.

In another embodiment, the invention includes a container adapted for holding or transporting hydrogen peroxide, wherein the container comprises a metal or a nonmetal with a metallic liner or nonmetal (e.g., polymer matrix composite) having an interior hydrogen peroxide-contacting surface and a zirconium nitride barrier coating overlaying and formed on or deposited on the interior hydrogen peroxide-contacting surface.

The zirconium nitride barrier coating of the invention may be applied to a variety of substrates, as discussed in detail herein below. Example substrates according to the invention include alloys comprising greater than about 50% iron by weight; or superalloys comprising greater than about 50% nickel by weight or greater than about 50% cobalt by weight; or alloys comprising greater than about 50% titanium by weight. In another embodiment the substrate may be an alloy comprising greater than about 50% aluminum by weight or greater than about 50% magnesium by weight; or a ceramic; or an organic polymer; or a composite comprising a matrix of metal, ceramic, or polymer, and combinations thereof.

The invention also pertains to an article adapted for use in a hydrogen peroxide containing environment, wherein the article comprises a substrate that may be metallic and a barrier coating of zirconium nitride disposed on said substrate for protecting the substrate from reacting with hydrogen peroxide.

These exemplary embodiments of the invention overcome hydrogen peroxide incompatibility limitations known in the art. Few materials (especially metallic materials) are compatible with hydrogen peroxide. Most metals, such as iron, chromium, copper, and silver, are known to catalyze the rapid and exothermic decomposition of hydrogen peroxide. From a hydrogen peroxide compatibility point of view, various materials have been divided into four principal art-recognized classes, as summarized in Table 1.

TABLE 1

Hydrogen Peroxide Compatibility Classes for Various Materials

| Class | Rating | Max. % Active Oxygen Loss/Week 85° F. | Max. % Active Oxygen Loss/Week 150° F. | Min $H_2O_2$ Stability After Test | Description |
|---|---|---|---|---|---|
| 1 | Satisfactory for unrestricted use with $H_2O_2$ | 0.2 | 5.0 | 95% | Essentially no effects on $H_2O_2$ or metal |
| 2 | Satisfactory for repeated short term contact with $H_2O_2$ | 6.0 | 80.0 | 90% | No other effects on $H_2O_2$, slight bronzing of metal allowable, but no corrosion |
| 3 | Only for short-time contact with $H_2O_2$ | 11.0 | 100.0 (24 hrs) | 15% (85° F. test) | Bronzing/staining, but no rusting or other corrosion products, slight attack allowed |
| 4 | Not recommended | — | — | — | Pitting and corrosion during and after testing |

Only a few materials are known to be compatible with high concentration hydrogen peroxide (e.g., >90%), principally pure aluminum, 5254 aluminum alloy (comprising 96.2% Al, 3.5% Mg, and 0.25% Cr) and high purity zirconium, which are class 1 materials, and from which hydrogen peroxide storage tanks may be constructed; CRES (class 2), 6061 Al (class 2), and 6063 Al (class 1) as tubing material; CRES (class 2) as material for machined components; and Silastic (class 2), Teflon (class 1-2) (TEFLON refers to polytetrafluoroethylene and is a registered trademark of E. I. du Pont de Nemours and Co., Wilmington, Del.), and Viton (class 1-2) as bladder material, O-rings, and gaskets. While 5254 aluminum alloy is compatible with hydrogen peroxide, its use in aerospace applications is not ideal. Because this aluminum alloy is relatively soft, components manufactured from this material must be comparatively heavy, which substantially limits the range and payload capacity of a hydrogen peroxide rocket system. Even if such materials were used as barrier coatings, they still would be undesirable because thick layers would be required which must be machined after coating, and precision parts cannot be satisfactorily coated with such materials.

Ideally, all $H_2O_2$-wetted components in an aerospace propulsion system should be made from class 1 materials. However, the use of class 2 materials may be unavoidable. In addition, due to strength requirements, cases may exist in which borderline class 3 materials, which not only catalyze decomposition but also rust in service, need to be exposed to $H_2O_2$. The use of non-class 1 materials typically can be tolerated provided the following conditions are met: accelerated $H_2O_2$ decomposition (due to exposure to non-class 1 materials) is shown to contribute insignificantly to the overall pressure rise in the system; $H_2O_2$ stability is not affected; i.e., non-class 1 materials do not contribute metallic ions that lead to lower $H_2O_2$ stability; there is no pitting/corrosion (signs of rusting or other corrosion products) during or after exposure of the material; and weight loss is insignificant (negligible corrosion rate) and mechanical properties do not degrade because of exposure. While the use of class 2 materials in an aerospace system may be tolerated, class 3 or 4 materials are generally not acceptable. For such class 3 or 4 materials, the application of a protective coating of zirconium nitride permits their use in hydrogen peroxide containing environments, whereas currently only class 1 materials and in exceptional cases (provided all of the aforementioned conditions are met) class 2 materials may be used.

Prior art attempts to use hydrogen peroxide as a rocket propellant are restricted to the use of a limited number of alloys, which are undesirable from a structural capability point of view. This material limitation leads to greater costs because of weight penalties and increases in complexity of designs to allow for use of available materials. The present invention expands the number of materials that may be used in hydrogen peroxide aerospace applications, including stronger and lighter materials.

In a monopropellant liquid rocket application (e.g., in a reaction control system), hydrogen peroxide is the only propellant used. One skilled in the art will recognize that such a monopropellant system may be modified by adding an additional hypergolic fuel system to produce a bipropellant rocket (e.g., in a bipropellant main propulsion system), where hydrogen peroxide is decomposed to burn a fuel as an oxidizer.

Figure 1B:
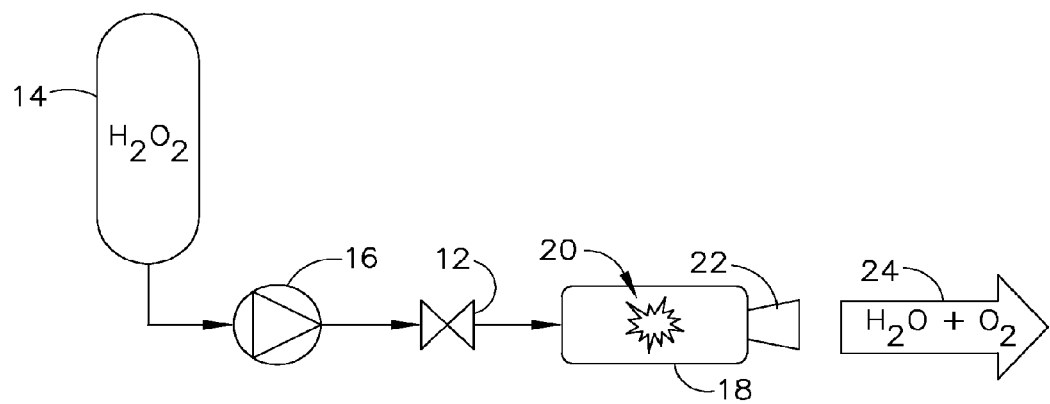

In an example configuration depicted in FIGS. 1A and 1B, a flameless jet of steam (24) provides the thrust of the engine. In a highly exothermic reaction, hydrogen peroxide decomposes into superheated steam and oxygen as it is passed through a catalyst pack (20) within a combustion chamber (18) and expelled through a nozzle (22). Components of the propellant system may include a pressure tank to hold hydrogen peroxide propellant (14), a pressure tank (10) to store nitrogen or another inert gas to pressurize the hydrogen peroxide, pressure regulators, flow regulators (12), valves, lines, gauges, pumps (16), and other means for conveying (or regulating) the flow of liquid propellant. Metallic component surfaces that may contact hydrogen peroxide may be coated with a zirconium nitride coating of the invention.

Still referring to FIGS. 1A and 1B, the catalyst (20), which may be silver or platinum, converts liquid hydrogen peroxide into very hot steam and oxygen at high pressure. The resulting jet of gas provides impulse. The catalyst triggers decomposition, and the oxygen/steam that is produced is hot enough (>600° C.) either to be used directly (as a monopropellant) or to be decomposed to burn a fuel as an oxidizer (as a bipropellant). The hydrogen peroxide is 70% to 98% strength, so-called "high-test peroxide" or "HTP," which may be stored in a container (14), the interior surface of which is coated with a zirconium nitride coating layer according to the invention. In this manner, light-weight components that are coated with zirconium nitride may be employed.

Small hydrogen peroxide thrusters for attitude control are used by some satellites. The present invention provides benefits for the launching spacecraft, making it easier to throttle and safer to load and handle the hydrogen peroxide propellant.

This invention permits the use of more traditional, structurally robust, and better characterized alloys, regardless of their compatibility classification. The invention also enables the use of even class 4 materials in the fabrication of components for use in environments comprising hydrogen peroxide. For example, the use of wetted magnetic components in solenoid/latching valves in propulsion systems is essential to their operation. The material used for such components is typically CRES 446, which is a class 4 material and not only catalyzes decomposition but also rusts in service and there is no other choice. Such components are beneficially coated with zirconium nitride for longer and more reliable service in accordance with exemplary embodiments of the invention. The coating significantly reduces corrosion/degradation of the component and also minimizes factors reducing propellant effectiveness (active oxygen loss, propellant stability, metallic/organic contamination, and system level pressure rise) due to the influence of the wetted components.

Other benefits of the invention include considerable cost savings because of significant aerospace vehicle weight reduction, drastic decrease in complexity of designs, cheaper raw materials with less stringent processing requirements, and simpler fabrication processes, among others.

In an embodiment, the invention includes a propellant system for a launch vehicle with internal sections of components in contact with hydrogen peroxide coated with zirconium nitride. In another embodiment, the invention includes a method of protecting a hydrogen peroxide propellant system in a launch vehicle or space vehicle by coating internal metal surfaces with zirconium nitride. A zirconium nitride coating of the invention protects materials and limits corrosion, which improves the life of coated parts. The invention permits greater payload capability as a result of less weight needed in the propellant system. In addition, the invention minimizes factors reducing propellant effectiveness (active oxygen loss, propellant stability, metallic/organic contamination, and system level pressure rise) due to the influence of the wetted components.

The invention may be especially advantageously exploited in the emerging market of near-space rocket adventures, for either entertainment or research purposes. The invention may also be used in reaction systems for interplanetary vehicles or orbital satellites.

The invention enables the use of many more materials with better structural properties for some applications than art-recognized materials. Obtaining very hard surfaces that are not susceptible to corrosion is useful for the entire class of fluid control components that may be used in any system requiring long term exposure to hydrogen peroxide, including check valves, solenoid valves, poppet type control valves, burst diaphragms, orifices, and the like. Reusable rockets or reaction control systems used for station keeping or attitude control need to tolerate long-term exposure to hydrogen peroxide, which this invention provides.

Figure 2A:
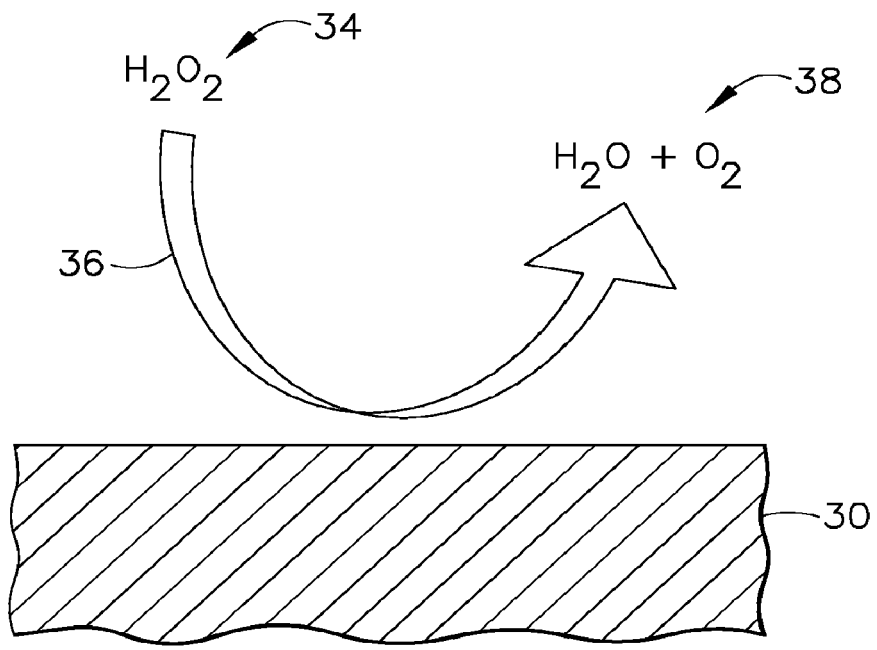
FIG. 2A illustrates the reaction of hydrogen peroxide with an incompatible material.
Figure 2B:
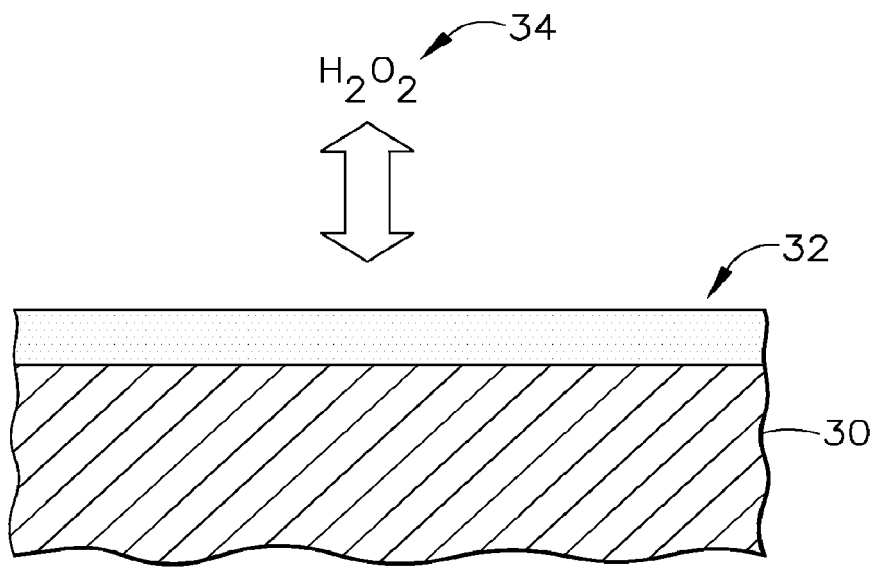
FIG. 2B illustrates the lack of reactivity with a material coated with zirconium nitride in accordance with the present invention.

FIGS. 2A and 2B schematically represent the principles of the invention. In FIG. 2A, hydrogen peroxide (34) is shown decomposing (36) into water and oxygen (38) in the presence of a substrate (30). The invention provides a zirconium nitride barrier coating (32), which provides hydrogen peroxide compatibility by significantly reducing corrosion/degradation of the component and also minimizing factors reducing propellant effectiveness (active oxygen loss, propellant stability, metallic/organic contamination, and system level pressure rise) due to the influence of the wetted components.

Figure 3A:
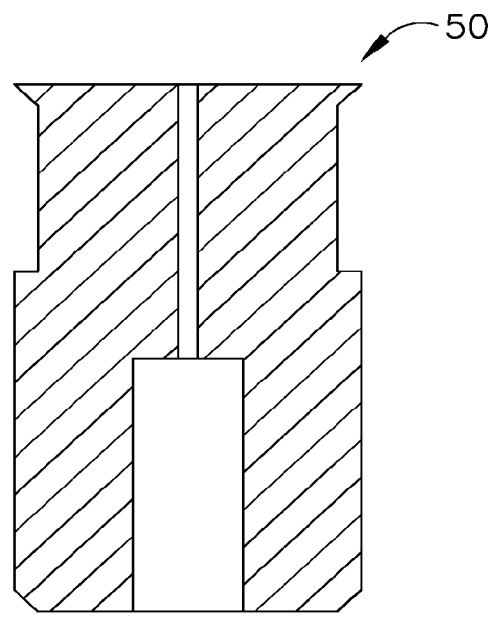
FIG. 3A is a cross section view of a test article coated with zirconium nitride.
Figure 3B:
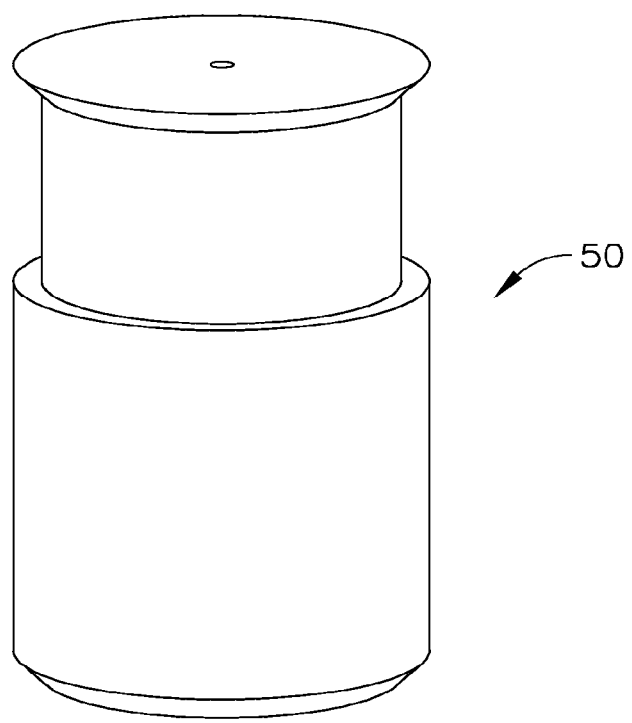
FIG. 3B is a perspective view of the same article.

Zirconium nitride is an excellent, easily applied, robust, reliable, and cost effective coating for all components requiring hydrogen peroxide compatibility. In order to illustrate these characteristics, a zirconium nitride barrier coating was applied to a CRES 446 test article (50) depicted in FIGS. 3A and 3B. The sample was successfully coated in two runs at 572° F. Coating thickness (measured by the calo method on witness pins located next to the part) was approximately 9 μm. Visual inspection of the zirconium nitride coated test article (50) shows that the line-of-sight PVD process coated the test article (50) completely, and it is expected that a zirconium nitride barrier coating may be applied to components with similarly complex geometries. The zirconium nitride coated test article (50) after being incubated in 90% hydrogen peroxide for five days at room temperature showed no damage.

In order to study extreme conditions, sample 446 CRES (class 4) test articles (FIG. 3) with and without a plasma vapor sprayed zirconium nitride barrier coating as well as a zirconium nitride coated mild steel (not depicted) were immersed in 90% hydrogen peroxide at 150° F. for seven days. The zirconium nitride barrier coating substantially improved the compatibility of mild steel and 446 CRES materials (from class 4 to borderline class 1-2). Chrome oxidation into solution from CRES 446 was reduced by a factor of seven through use of a zirconium nitride barrier coating. The results indicated that plasma vapor deposited zirconium nitride (PVD-ZrN) barrier coatings may be used to protect components of complex geometry that catalyze decomposition or corrode when exposed to hydrogen peroxide.

The principles of the invention may be used in many technical disciplines, including various industrial and manufacturing applications. For example, a significant industrial use of hydrogen peroxide is pulp- and paper-bleaching. Other bleaching applications are becoming more important as hydrogen peroxide is seen as a more environmentally-benign alternative to chlorine-based bleaches. Other major industrial applications for hydrogen peroxide include the manufacture of percarbonates and perborates, used as laundry detergent bleaching agents. It is also used in the production of certain organic peroxides such as dibenzoyl peroxide, which are used as free radical polymerisation initiators and as a topical acne treatment. Hydrogen peroxide is also used in the production of epoxides, such as propylene oxide, and peracids, such as peracetic acid and meta-chlorobenzoic acid, which are useful in synthetic chemistry. The metallic surfaces of hydrogen peroxide storage containers and fluid conveyance means (e.g., flow regulators, valves, lines, gauges, and pumps), as well as the surfaces of chemical reaction vessels that may contact hydrogen peroxide may be beneficially modified by application of a zirconium nitride barrier coating as described herein.

A zirconium nitride barrier coating is deposited by methods known in the art, such as physical vapor deposition, sputtering, air plasma spray, organo-metallic chemical vapor deposition, chemical vapor deposition, and the like. Thicknesses of the zirconium nitride barrier coating can vary from about 0.2 micrometers to about 250 micrometers, although about 2-125 micrometers is preferred. Also, if thick impermeable barrier coatings are used (about 125 micrometers or more), a graded deposit may be necessary to keep internal stresses minimized in order that coating delamination does not occur. Multilayered barrier coatings are within the scope of the invention, including coatings with two or more zirconium nitride coatings. In general, zirconium nitride barrier coatings are prepared by evaporating a source under vacuum and condensing vapor or plasma with coating components on a substrate surface. Example substrates include class 1 and class 2 materials, such as low carbon steel (including so-called "stainless" steel), high purity aluminum (>95%), and zirconium.

A number of techniques have been employed to provide barrier coatings on metal substrates. In so-called "line-of-sight" processes, a substrate is maintained in a fixed position during the deposition step, and the barrier coating is formed on the substrate directly in the path of the coating material source. Portions of the substrate, particularly internal and external surfaces that are shielded, e.g., such as the opposite sides and edges of the substrate that extend inwardly and substrate layers that are internal or partially shielded from the coating source are usually not uniformly coated. To optimize line-of-sight processes, a fixed distance between the source and the substrate should be maintained. In vacuum deposition processes, gas pressure is less than the ambient atmospheric pressure. Vacuum deposition is the deposition of a film or barrier coating in a vacuum (or low-pressure plasma) environment. Generally, the term is applied to processes that deposit atoms or molecules one at a time, such as in physical vapor deposition (PVD) or low-pressure chemical vapor deposition (LPCVD) processes. It can also be applied to other deposition processes such as low pressure plasma spraying (LPPS). The vacuum increases the "mean free path" for collisions of atoms and high-energy ions and helps reduce gaseous contamination. When establishing plasma in a vacuum, gas pressure affects the enthalpy, the density of charged and uncharged particles, and the energy distribution of particles in the plasma. The plasma may also be used to "activate" reactive gases (e.g., ammonia) and vapors in reactive deposition processes and fragment the chemical vapor precursors in plasma-enhanced chemical vapor deposition (PECVD).

Vacuum evaporation (including sublimation) is a PVD process where material from a thermal vaporization source reaches the substrate without collision with gas molecules in the space between the source and substrate. For an appreciable deposition rate to be attained, the material vaporized must reach a temperature where its vapor pressure is 10 mTorr or higher. Typical vaporization sources are resistively heated stranded wires, boats or crucibles (for vaporization temperatures below 1500° C.) or high-energy electron beams that are focused and rastered over the surface of the source material.

Sputter deposition is the deposition of particles vaporized from a surface (sputter target) by the physical sputtering process. Physical sputtering is a non-thermal vaporization process where surface atoms are physically ejected by momentum transfer from an energetic bombarding particle that is usually a gaseous ion accelerated from a plasma or an "ion gun." In arc vapor deposition, the vapor source is the vaporization of the anode or cathode of a low-voltage, highcurrent electric arc in a good vacuum or low pressure gas. The usual configuration is the cathodic arc where the evaporation is from an arc that is moving over a solid cathodic surface. In the anodic arc configuration, the arc is used to melt the source material that is contained in a crucible. The vaporized material is ionized as it passes through the arc plasma to form charged ions of the film material. In the arc vaporization process, molten globules (macros) can be formed and deposited on the substrate. To avoid this problem, a plasma duct may be used to bend the charged particles out of the line-of-sight of the source, and the macros will deposit on the walls of the duct.

The zirconium nitride source coating materials may include metallic zirconium, and ammonium chloride or nitrogen, depending on the coating process employed. The coating process chosen may depend on the production equipment available, personnel experience, and common practice. Prior to coating, a substrate may undergo a surface preparation step, which may be necessary to make the substrate activated to receive the coating and free of organic and non-organic contaminants. Exemplary surface preparation steps include sand blasting, hydroabrasive blasting, vibropolishing, and rinsing or degreasing with aqueous or organic solvents, steam, or hot water. After coating, an additional step of annealing may be carried out at reduced pressure and elevated temperature.

While the invention has been described with reference to certain preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to any particular embodiment disclosed as the best mode contemplated for carrying out this invention, but that the invention will include all embodiments falling within the scope of the appended claims.

The invention claimed is:

1. A method of protecting an aerospace vehicle propellant system comprising the step of:
    coating a propellant-contacting surface of an aerospace vehicle propellant system with a zirconium nitride barrier coating.

2. The method of claim 1, wherein said propellant-contacting surface is protected from corrosion or degradation when in contact with a hydrogen peroxide propellant.

3. The method of claim 2, wherein said hydrogen peroxide propellant is greater than or equal to about 30% hydrogen peroxide by weight.

4. The method of claim 2, wherein said hydrogen peroxide propellant is greater than or equal to about 70% hydrogen peroxide by weight.

5. The method of claim 2, wherein said hydrogen peroxide propellant is greater than or equal to about 90% hydrogen peroxide by weight.

6. The method of claim 2, wherein said hydrogen peroxide propellant is greater than or equal to about 98% hydrogen peroxide by weight.

7. The method of claim 1, wherein said coating step comprises evaporating a zirconium source under reduced pressure and condensing vapor or plasma onto a substrate thereby forming a zirconium nitride barrier coating.

8. The method of claim 1, wherein the thickness of said zirconium nitride barrier coating is between about 0.025 µm and about 250 µm.

9. The method of claim 1, wherein the thickness of said zirconium nitride barrier coating is between about 1 µm and about 25 µm.

10. A rocket engine component comprising a substrate having a propellant-contacting surface and zirconium nitride barrier coating overlaying said substrate and formed on or deposited on said propellant-contacting surface.

11. The rocket engine component of claim 10, wherein said propellant-contacting surface is protected from corrosion when in contact with hydrogen peroxide or wherein hydrogen peroxide is protected from decomposition when in contact with said propellant-contacting surface.

* * * * *